July 26, 1932. W. TIMSON 1,869,289
IMPROVEMENT RELATING TO WEIGHING APPARATUS
Filed Aug. 25, 1930
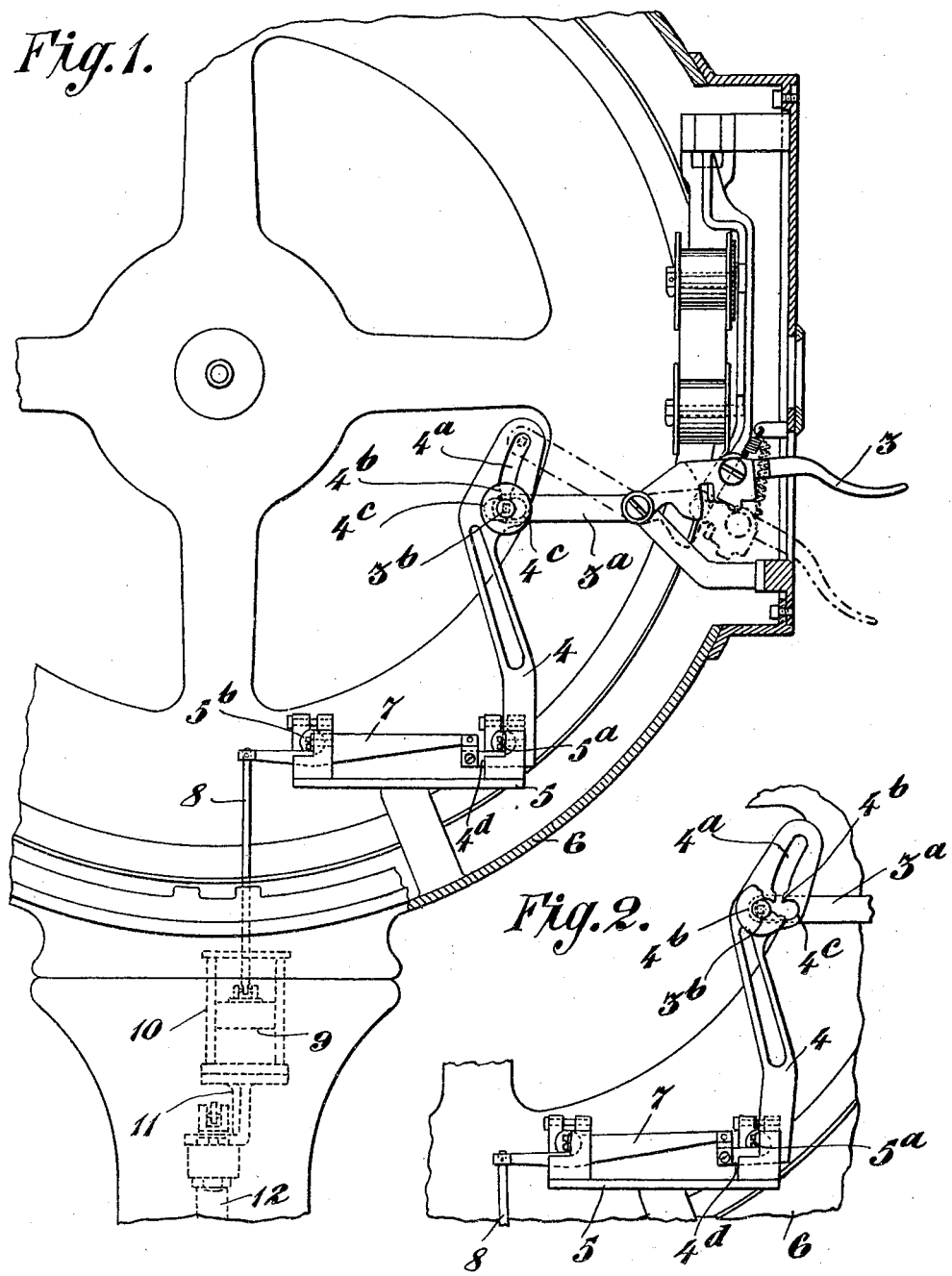
Inventor:- William Timson.
Per:- George E. Folkes.
Attorney.

Patented July 26, 1932

1,869,289

UNITED STATES PATENT OFFICE

WILLIAM TIMSON, OF SOHO FOUNDRY, BIRMINGHAM, ENGLAND, ASSIGNOR TO W. & T. AVERY, LIMITED, OF BIRMINGHAM, ENGLAND

IMPROVEMENT RELATING TO WEIGHING APPARATUS

Application filed August 25, 1930, Serial No. 477,602, and in Great Britain September 4, 1929.

This invention has reference to improvements in or relating to means for use in conjunction with the printing mechanism of weighing apparatus for preventing a printing operation being effected except when the apparatus is in equilibrium.

The invention consists of an improved means for use in conjunction with the printing mechanism of weighing apparatus for preventing a printing operation being effected except when the apparatus is in equilibrium, characterized in that the actuating lever or the like of the printing mechanism co-operates with a locking means which is connected to and governed by a dashpot controlled member adapted to be influenced by a movement of the weighing mechanism whereby when the apparatus is out of equilibrium the movements transmitted through the dashpot to the said member are caused to move the locking means so as to obstruct and prevent the actuation of the aforesaid lever or the like.

The invention further resides in the details of construction of the improved mechanism to be described hereinafter.

The invention will now be described with particular reference to the accompanying sheet of drawing which illustrates the invention in its application to a weighing scale of known construction which employs a rotatable disc indicator carrying an annular type ring and which incorporates a printing mechanism of the kind described and claimed in the specification of my application Serial No. 335,967 dated 29th January 1929.

In the drawing:—

Figure 1 is a part sectional front elevation of so much of the weighing scale as is necessary to an understanding of this invention and shows the printing mechanism and controlling means therefor in accordance with the invention in the position which permits a printing operation to be effected.

Figure 2 is a detail view showing the way in which the printing lever is prevented from movement when the weighing mechanism is not in equilibrium.

The printing lever 3 is formed with an inwardly directed extension 3ª which is provided adjacent to the end thereof with a horizontally disposed projection in the form of a square peg 3ᵇ. The peg is adapted, when the scale is in equilibrium, to be capable of working freely in a substantially vertically disposed arcuate slot 4ª formed in the longer and upstanding arm of a bell crank lever 4 which is pivotally mounted at 5ª in a bracket 5 supported from the scale housing 6. At its lower end the slot 4ª is formed with a neck 4ᵇ the width of which is only slightly greater than the width of the peg 3ᵇ said neck opening out into a substantially horizontally disposed slot 4ᶜ. The shorter arm 4ᵈ of the bell crank lever 4 has pivotal connection to the longer arm of an uneven armed lever 7 fulcrumed at 5ᵇ in bearings carried by the bracket 5. The shorter arm of the lever 7 has pivotal connection to the piston rod 8 carrying the piston 9 of a dashpot the cylinder 10 wherefor is carried by a bracket 11 secured to the check arm 12 of the weighing apparatus, the check arm being a moving member connected in known manner to the lever system.

The dashpot is auxiliary to the ordinary dashpot (not shown) employed for damping the motion of the weighing mechanism and the dashpots are preferably adjusted initially so that there is a lag between the auxiliary dashpot and the main dashpot.

The operation of the invention is as follows:—

Subsequent to the placing of an article to be weighed on the goods pan and prior to the indicating mechanism coming to rest, any movement of the scale pan which takes place is transmitted through the check arm 12 to the cylinder 10 of the dashpot and occasions a movement of the piston 9 which piston through the rod 8 and lever 7 rocks the bell crank lever 4 and moves the arcuate slot 4ª therein out of register with the projection 3ᵇ on the extension 3ª of the printing lever 3 and thereby prevents the actuation of the said printing lever. When equilibrium is attained the neck 4ᵇ of the slot 4ª is in register with the projection 3ᵇ which enables the printing lever to be depressed for effecting a printing operation since the projection 3ᵇ can now pass through the neck 4$^b$ into the arcuate slot 4$^a$. The provision of the horizontal slot 4$^c$ serves to prevent a printed record being obtained through a jarring or snatching of the printing lever 3 before the weighing mechanism has come to rest as in the event of a complete registry not obtaining the sections of the slot 4$^c$ adjacent the neck 4$^b$ act as leads and cause a deflection of the bell crank lever 4 from the registering position.

Although the invention has been described in its application to a printing mechanism of the kind described in my aforesaid patent specification it will be appreciated that it is capable of being embodied equally well with other analogous forms of printing mechanism for use with weighing apparatus.

It will be appreciated that there is no direct connection between the weighing mechanism and the counterbalanced lever and that the lag between the main dashpot and the air dashpot provides an additional safeguard that equilibrium shall be obtained before a printing operation can be effected.

What I claim is:—

1. A means for use in conjunction with the printing mechanism of weighing apparatus for preventing a printing operation being effected except when the apparatus is in equilibrium comprising an actuating member for the printing mechanism, a locking means for said member, a dashpot one part whereof is connected to and movable with a moving member of the weighing mechanism and the other part whereof is connected to and movable with the aforesaid locking means, whereby when the apparatus is out of equilibrium the movement of one part of the dashpot influences the other part of the dashpot and causes the said means to be moved into an obstructing position relatively to the actuating member and thereby preventing the operation of the said member.

2. A means for use in conjunction with the printing mechanism of weighing apparatus for preventing a printing operation being effected except when the apparatus is in equilibrium, comprising an actuating member for the printing mechanism, a locking lever, a projection carried by the actuating member, a slot formed in said locking lever and within which the projection is adapted to work freely when the actuating member is being operated said slot being in registry with the projection and thus permitting of the entry of the projection thereinto only when the weighing apparatus is in equilibrium, a dashpot means for transmitting any movement of the weighing mechanism to the said lever whereby the slot is moved out of registry with the projection whenever the apparatus is out of equilibrium so as to prevent operation of the actuating member when the weighing apparatus is in the last mentioned condition.

3. A means for use in conjunction with the printing mechanism of weighing apparatus for preventing a printing operation being effected except when the apparatus is in equilibrium, comprising an actuating member, a lever, a slot formed in said lever having a narrow neck and laterally extending portions at the end adjacent to the neck, a projection on the actuating member adapted to work freely in the aforesaid slot when the actuating member is being operated, said neck being in registry with the projection so as to permit of the entry of the said projection thereinto only when the weighing apparatus is in equilibrium, a dashpot one part whereof is connected to a moving member of the weighing apparatus and the other part whereof has connection with the aforesaid lever whereby in the event of any movement of the weighing apparatus, as obtains when the apparatus is out of equilibrium, is transmitted to the lever whereby the neck of the slot is moved out of registry with the projection on the actuating member for preventing the operation of the said actuating member when the weighing apparatus is in the last mentioned condition.

4. A means for use in conjunction with the printing mechanism of weighing apparatus for preventing a printing operation being effected except when the apparatus is in equilibrium, comprising a printing lever, a locking lever having an arcuately shaped slot therein, a projection on the printing lever adapted to be in registry with the said slot when the weighing apparatus is in equilibrium and to enter and work within said slot so as to admit of the operation of the printing lever when permitted, a dashpot having connection with a moving part of the weighing apparatus and with the locking lever whereby any movement of the weighing apparatus as obtains when the apparatus is out of equilibrium is transmitted to the locking lever so as to move the slot out of registry with the projection on the printing lever and to prevent the operation thereof so long as any movement of the weighing apparatus obtains.

In testimony whereof, I have signed my name to this specification.

WILLIAM TIMSON.